United States Patent [19]

Maier-Laxhuber et al.

[11] Patent Number: 5,207,073
[45] Date of Patent: May 4, 1993

[54] ICE MAKING SYSTEM AND METHOD UTILIZING THE SORPTION PRINCIPLE

[75] Inventors: Peter Maier-Laxhuber; Reiner Engelhardt, both of Munich, Fed. Rep. of Germany

[73] Assignee: Zeo-Tech (Zeolith-Technologie GmbH, Munich, Fed. Rep. of Germany

[21] Appl. No.: 649,441

[22] Filed: Feb. 1, 1991

[30] Foreign Application Priority Data

Feb. 2, 1990 [DE] Fed. Rep. of Germany ....... 4003107

[51] Int. Cl.$^5$ ............................................. F25B 19/00
[52] U.S. Cl. ......................................... 62/269; 62/270; 62/169; 62/371
[58] Field of Search ............... 62/480, 76, 269, 371, 62/268, 270, 100, 169

[56] References Cited

U.S. PATENT DOCUMENTS

| | | | |
|---|---|---|---|
| 340,031 | 4/1886 | Csete | 62/269 |
| 618,934 | 2/1899 | Fleuss | 62/269 |
| 1,512,623 | 10/1924 | Maxwell | 62/4 |
| 1,559,223 | 10/1925 | Conill et al. | 62/269 |
| 1,808,056 | 6/1931 | Mitchell | 62/4 |
| 1,894,893 | 1/1933 | Schlumbohm | 62/269 |
| 2,027,571 | 1/1936 | Altenkirch et al. | 62/120 |
| 2,053,683 | 9/1936 | Schlumbohm | 62/120 |
| 2,323,902 | 7/1943 | Kleen | 62/118 |
| 3,018,638 | 1/1962 | Winkler | 62/237 |
| 3,257,817 | 6/1966 | Leonard, Jr. | 62/98 |
| 4,479,364 | 10/1984 | Maier-Laxhuber et al. | 62/477 |
| 4,531,384 | 7/1985 | Paeye | 62/238.3 |
| 4,660,629 | 4/1987 | Maier-Laxhuber et al. | 62/480 |
| 4,674,563 | 6/1987 | Maier-Laxhuber et al. | 165/104.12 |
| 4,752,310 | 6/1988 | Maier-Laxhuber et al. | 62/4 |
| 4,759,191 | 7/1988 | Thomas et al. | 62/480 |
| 4,802,341 | 2/1989 | Maier-Laxhuber et al. | 62/235.1 |
| 4,924,676 | 5/1990 | Maier-Laxhuber et al. | 62/269 |

FOREIGN PATENT DOCUMENTS

| | | |
|---|---|---|
| 636013 | 9/1936 | Fed. Rep. of Germany . |
| 2715075 | 10/1978 | Fed. Rep. of Germany . |
| 2720561 | 11/1978 | Fed. Rep. of Germany . |
| 513598 | 2/1955 | Italy . |
| 0018596 | of 1891 | United Kingdom ............ 62/269 |
| 312422 | 5/1929 | United Kingdom . |

OTHER PUBLICATIONS

*Zeolith-Wasser: Neues Stoffpaar Fur Warmepumpen Und Warmespeicher*, Dr. Peter K. Maier-Laxhuber, published Feb., 1984 in the periodical Commerze International, 45-46.

*Primary Examiner*—John M. Sollecito
*Attorney, Agent, or Firm*—Hoffmann & Baron

[57] ABSTRACT

An ice maker utilizing the sorption principle having an air tight sorption container which stores a solid sorption medium. A vacuum pump is connected to the sorption container and is operatively coupled to an icing container. The icing container is clamped to a flat sealing surface. The vapor contained in the icing container is removed by the vacuum pump causing a decrease in vapor pressure. An aqueous liquid is fed through a closeable feeding line from a supply container to the icing container so that the aqueous liquid solidifies within the icing container.

15 Claims, 2 Drawing Sheets

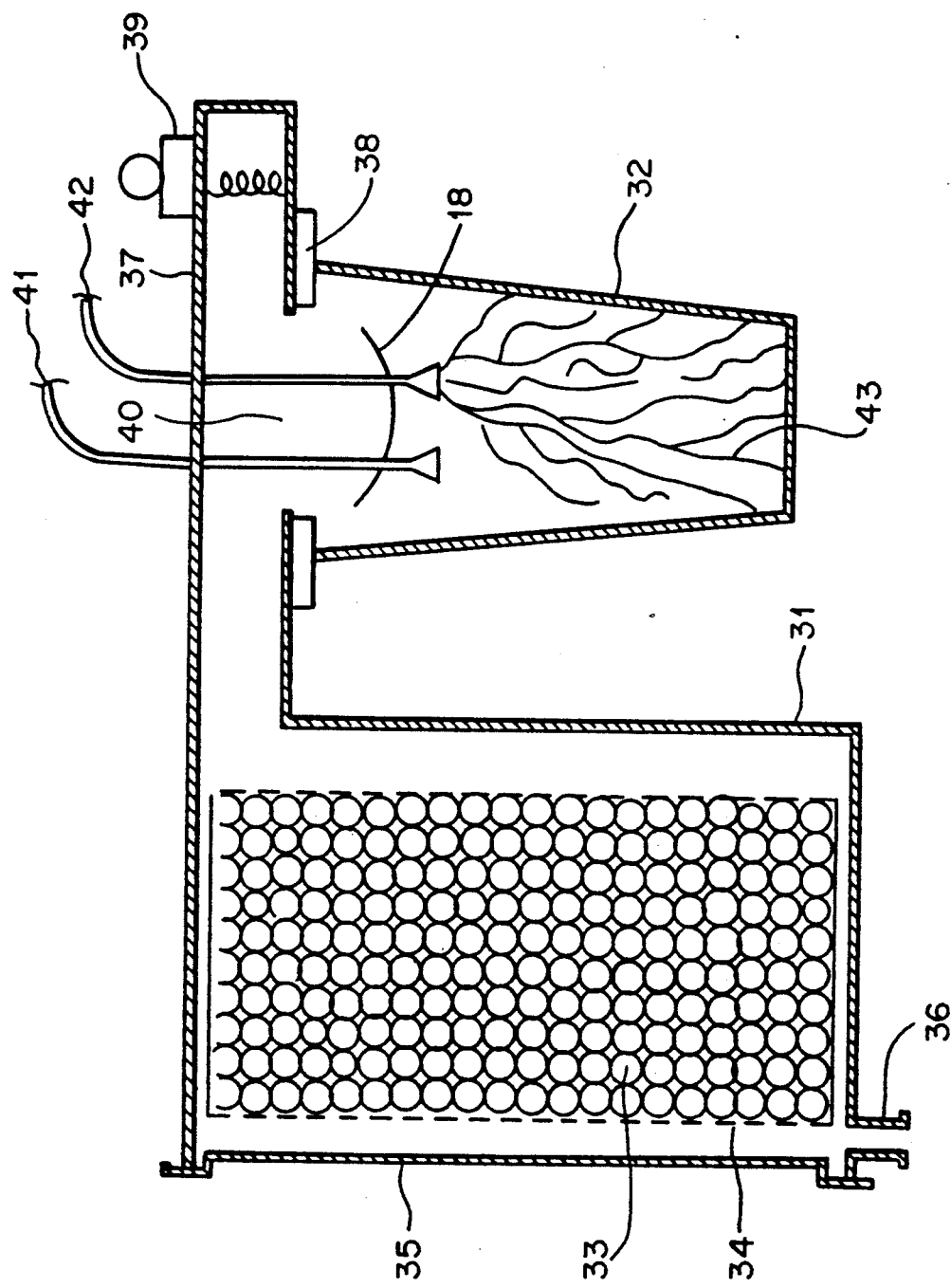

ICE MAKING SYSTEM AND METHOD UTILIZING THE SORPTION PRINCIPLE

BACKGROUND OF THE INVENTION

1. Field Of The Invention

The present invention relates to a system and method for making ice and more particularly to a system for making ice in accordance with the sorption principle.

2. Description Of The Prior Art

Methods and devices are presently known for making ice utilizing the evaporation principle. These methods for making ice remove vapor of an aqueous solution from the space above the surface of the solution which causes more liquid to evaporate. The evaporation of the liquid lowers the liquid's temperature causing it to enter a solid phase when its temperature reaches the solidification point temperature. The triple point of pure water, the point at which water can exist as a solid, liquid and vapor is at 0° C. and 6.1 mbar. However, aqueous solutions solidify at even lower temperatures and lower vapor pressures.

In order to solidify aqueous solutions by means of the evaporation principle, large amounts of vapor must be removed from the environment. If the vapor is then compressed to atmospheric pressure, considerable effort of mechanical devices is required. The mechanical energy which would be expended is considerably above alternative methods, for example, the energy needed to operate a conventional ice machine.

Furthermore, methods and equipment are presently known whereby the vapor to be removed is absorbed by a sorption medium. Such a method and equipment is used for freeze drying of foods. Although the latter method enables rapid ice making, it is not practical for making ice in the home or in a small retail establishment.

OBJECTS AND SUMMARY OF THE INVENTION

It is an object of the invention to provide a method and apparatus for economically efficient and commercial ice making.

It is a further object of the invention to provide a method and apparatus for rapid and energy efficient ice making.

In accordance with one form of the present invention, an ice making system utilizing the sorption principle includes a sorption container, a vacuum pump and an icing container. The sorption container and icing container are able to maintain a vacuum pressure produced by a vacuum pump which is operatively coupled to both the sorption container and the icing container. The sorption container is coupled to the icing container by a suction opening.

The ice making system further includes a feeding line which extends from a liquid supply container to the icing container. The icing container is coupled to the suction opening by a flat sealing surface which produces an air tight seal. The suction opening contains a venting device which provides a means through which the icing container can be repressurized. The suction opening also has a shut off device between the sorption container and the venting device which isolates the vapor within the icing container from the sorption container.

Zeolite has been successfully employed as a sorption medium. To assure uniform absorption of vapor within the sorption medium, sorption medium granulates should be used to produce optimum results. However, sorption mediums have limited absorption capabilities. In order to regenerate the sorption medium, the ice making system should include a heating device capable of heating the sorption medium so that the previously absorbed liquid vapor can be expelled.

These and other objects, features, and advantages of this invention will be apparent from the following detailed description of illustrative embodiments thereof, which is to be read in connection with the accompanying drawings.

BRIEF DESCRIPTION OF THE DRAWINGS

FIG. 2 is a cross-sectional view of the sorption container having sorption medium filler and an attached ice container having ice therein.

DETAILED DESCRIPTION OF THE PREFERRED EMBODIMENTS

Figure 1:
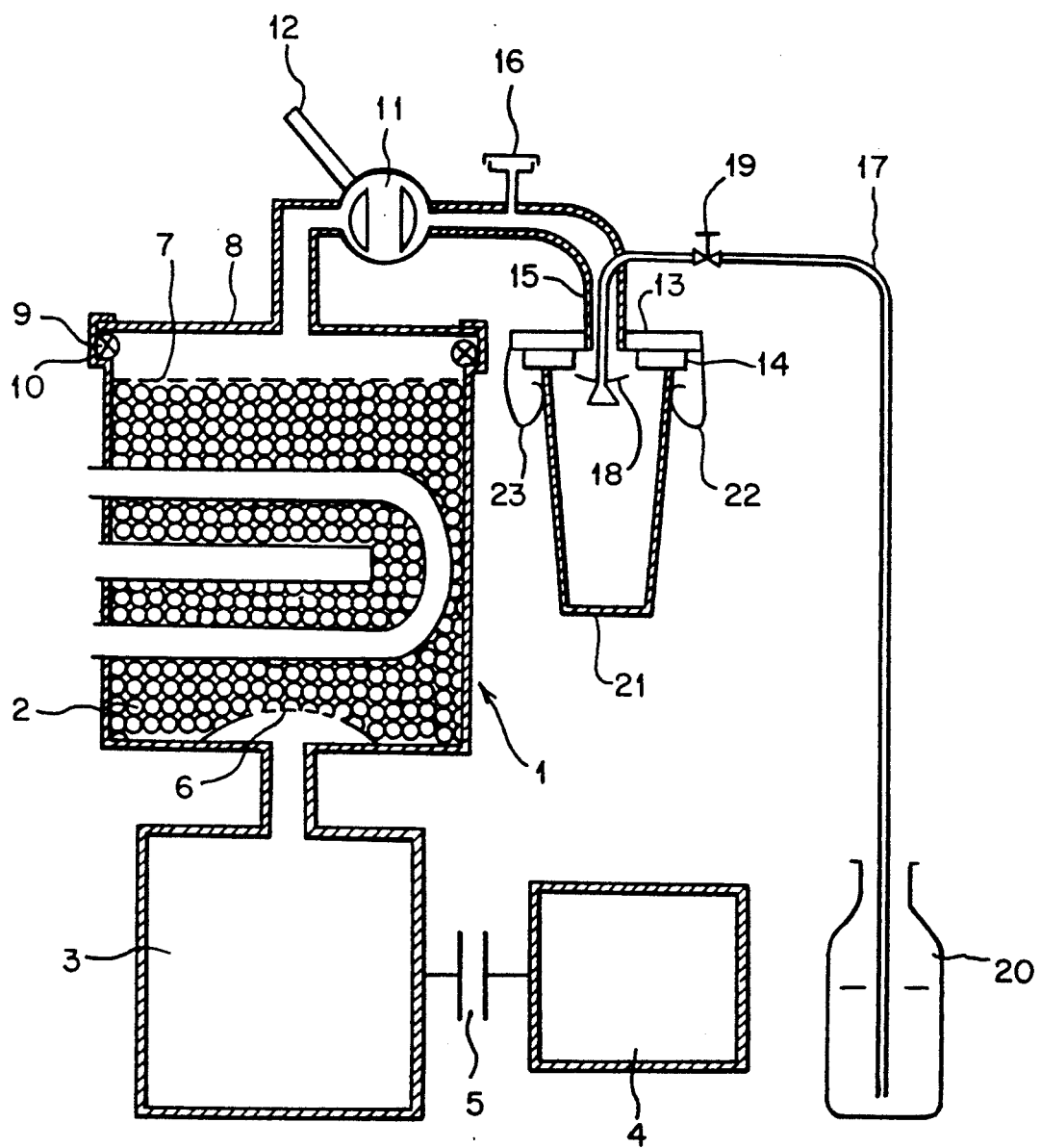
FIG. 1 is a cross-sectional view of the ice making system utilizing the sorption principle.

Referring now to FIG. 1 of the drawings, an ice making system utilizing the sorption principle constructed in accordance with the present invention will now be described. The ice maker illustrated in FIG. 1 contains a sorption medium 2 in form of a granulate. A vacuum pump 3 in the lower area of the sorption container 1 is driven by means of an electromotor 4 and a coupling 5 flanged onto it. The sorption medium 2 is fixed by means of a wire netting 6 and 7. A cover is disposed in the upper part of sorption container 1 which is braced air tight on the sorption container 1 by means of a sealing ring 9 and clamps 10. Through a ball stopcock 11 which is actuated by means of a manual lever 12, a flat sealing face 13 is connected to a suction opening 15. The flat sealing face is provided with a smooth seal 14. A vent device 16 is inserted between the stopcock 11 and the flat sealing face 13. A feeding line 17 is partially contained within the suction opening 15. The feeding line 17 expands to form a funnel-like discharge portion at one end which extends inside an icing container 21. A baffle 18 is located below the suction opening 15 and is mounted on feeding line 17 and thereby prevents flow of liquid from the icing container to the sorption medium. A shut off stopcock 19 is located on feeding line 17. The shut off stopcock 19 controls the flow of the liquid to the icing container 21 which is to be solified. A second end of the feeding line 17, which does not contain the funnel-like discharge portion, extends into a supply container 20 which stores the liquid to be solidified. Holding clamps 22 and 23 allow differently shaped icing containers 21 with different cross sectional openings to be attached and sealed airtight to the smooth seal 14 of the flat sealing face 13. The holding clamps 22 and 23 also prevent the icing container from separating and falling from the flat sealing face 13 after venting.

The following method is performed with the aid of the ice maker of the present invention for generating water ice in a drinking glass.

The icing container 21 is pressed with its opening onto seal 14 and the ball stopcock 11 is opened. By activating the ball stopcock, the vacuum pump 3 is turned on by electromotor 4. Since the venting device 16 and the shut off stopcock 19 are automatically closed, the pressure in the icing container and the sorption container 1 readily drop below 6.1 mbar. After the pressure drop has been achieved, the shut off stopcock 19 is opened so that the water is suctioned from the supply container and exits at the funnel shaped expansion end of the feeding line. As the water enters and falls to the bottom of the icing container, it immediately freezes to ice. The discharged water vapor is absorbed in sorption medium 2. As soon as the desired amount of ice has been made, the shut off stopcock 19 and the ball stopcock 11 are closed. Simultaneously, the venting valve 16 can be opened in order to repressurize the drinking container. The holding clamps 22 and 23 prevent the drinking container from falling and breaking during the venting process. After venting, the drinking container 21 containing the newly made ice can be released from the holding clamps 22 and 23. The sorption container 1 remains under vacuum due to the repositioning of the ball stopcock 11 until the next icing container has been mounted. Therefore, as a result of the position of the ball stopcock 11, the vacuum pump 3 does not have to repressurize the entire ice maker. But, depending on the size of the icing container, only about 100 to 150 mbar of vapor pressure must again be removed by the vacuum pump. As a result of not repressurizing the entire system, the re-depressurizing time can take only a few seconds.

Referring now to FIG. 2 of the drawings, a second embodiment of the ice making system utilizing the sorption principle constructed in accordance with the present invention will now be described. The ice maker which is partially illustrated in FIG. 2, operates without a shut off device between the sorption container 31 and icing container 32. A zeolite filler 33 is mounted in sorption container 31 within a gas permeable housing 34. The gas permeable housing 34 and the zeolite filler 33 can be simultaneously replaced as one unit. The unit can be removed from the sorption container 31 through a vacuum tight access device 35. A connecting socket 36 connects the sorption container to the vacuum pump (not shown in FIG. 2). The upper part of the sorption container 31 is provided with an extension 37 which forms a flow conduit to the icing container. A flat sealing face 38 is provided between extension 37 and icing container 32 so as to secure the icing container to the sorption system in a vacuum tight manner. A venting valve 39 repressurizes the icing container 32 and sorption container 31. Two feeding lines 41 and 42 extend through suction opening 40. Each feeding line has its own funnel-like discharge end suspended in the upper part of the icing container 32. An ice structure 43 is shown within icing container 32. The ice structure 43 starts its formation from the funnel-like discharge end, which can be removed from the feeding lines 41 and 42 when the icing container is separated from the flat sealing face 38.

In accordance with the present invention, aqueous liquids can be quickly and easily solidified in icing containers of any shape and almost any cross sectional opening. As a result of a vacuum pressure generated by a vacuum pump, icing containers are pressed air tight against a flat sealings surface of the sorption system. Since the sealing surface is flat and has a smooth seal, it is not necessary to place the icing container in the center the vacuum suction opening. In addition, the use of icing containers with a small cross sectional opening can be used (i.e., a shot glass) since even with a small cross sectional opening, sufficient contact pressure is produced due to a low operating pressure. On the other hand, the flat sealing surface may be so large that icing containers such as wine or champaign glasses may be used. The flat sealing surface is aligned so the icing container is substantially vertical. Therefore, the inflowing liquid and the frozen liquid particles drop directly to the bottom of the icing container.

During the absorption of vapor from the icing container by the sorption medium, vapor flow speeds through the suction opening may exceed 100 m/s. As a result of this flow speed, water drops or frozen ice particles may also be forced into the sorption container. In order to prevent the water or ice from entering the flow conduit, a drip or particle separator is situated within the icing container so that the water drops and ice particles will fall to the bottom of the icing container. Advantageously, the drip separator is located at the mouth of the suction opening such that the water drops and ice particles are repeatedly deflected and subsequently prevented from flowing through the suction opening to the sorption container.

The feeding line which supplies liquid from the supply container to the icing container discharges at a point within the icing container and below the drip separator, but at a considerable distance above the bottom of the icing container. Relatively good results are obtained when the diameter of the feeding line is approximately 1 mm and the maximum diameter of the funnel-like outlet of the feeding line is 10-20 mm. As a result of this arrangement and configuration of the feeding line outlet, blockage of the feeding line at the discharge outlet during the freezing operation can be effectively prevented.

In a preferred embodiment, the feeding line is contained within the suction opening. In addition, the drip separator and the discharge outlet opening of the feeding line are configured to form one unit. In this manner, it is possible to provide a compact unit containing both the drip separator and feeding line which does not extend a significant distance into the icing container even when a small icing container is used. Preferably, the feeding line and the drip separator are mounted so the entire unit can be easily disconnected from the ice maker. Disconnection of the drip separator/feeding line unit allows the unit to be easily cleaned.

It is also possible to provide many different feeding lines to supply various types of aqueous solutions from different supply containers. In this manner it is possible, with the same ice maker, to freeze water, fruit juices and even cream (to produce ice cream) without reconfiguration of the ice maker. Each feeding line of the ice maker with multiple supply containers may have separate discharge outlets or the ice maker may have a common discharge outlet.

The feeding lines are provided with a shut-off stopcock. After the pressure in the icing container falls below the operating pressure of 6.1 mbar, liquid from the supply container is permitted to flow through the feeding line into the icing container. If the liquid is supplied to the icing container before the pressure in the icing container drops to 6.1 mbar or less, (in aqueous solutions the pressure should be even lower), the liquid cannot solidify. This low pressure value is called the ice operating pressure. If the container pressure is not low enough, the liquid will not freeze while falling to the bottom of the container. The liquid will then collect on the bottom of the icing container and freeze when the container pressure drops below the ice operating pressure. The liquid will then undergo a violent evaporation reaction and the surface of the liquid will transform into ice while a liquid phase remains under the ice layer. In order to prevent this situation, it is advantageous to provide an automatic control which prevents liquid flow from the supply container before the pressure in the icing container attains the ice operating pressure. An optical pressure indicator which indicates when the container pressure reaches the ice operating pressure is advantageous. Furthermore, pure automatic injection devices which monitor container pressure are also known from cryogenics technology.

Mechanical feeding devices which pump liquid through the feeding lines are not required because the low pressure of the icing contain draws the liquid through the feeding line at a sufficient rate.

It is particularly advantageous to use flexible hoses as feeding lines. Therefore, the feeding lines can be easily inserted into almost any supply container which stores the liquid to be frozen. Supply containers may take many shapes including mineral water bottles, milk bottles and fruit juice containers among others. The system can operate if a relatively large opening is pierced in the cover or the upper face of the package through which the thin flexible feeding hose is inserted.

A vacuum pump operates to lower the pressure of the system below 6.1 mbar. In the preferred embodiment, the vacuum pump has a high suction volume which can accommodate a relatively large icing container in addition to reducing the pressure in the sorption container. However, a vacuum pump of 1 mbar in magnitude has been shown to be sufficient. Theoretically, it would be sufficient to attain a system pressure of 6.1 mbar, but in order to overcome corresponding flow resistances in the suction opening as well as in the sorption medium, the end pump pressure should be lower. It has been found that an end pump pressure of less than 1 mbar does not provide a further advantage. If a rotary vane vacuum pump is used, care should be taken that an oil return flow safety is provided so that the discharge of oil mist from the discharge opening is as low as possible.

It is advantageous to design the sorption container so that the vapor produced in the icing container can interact with the sorption medium filler in a uniform manner. The portions of the system which are open spaces such as hollow spaces within the sorption medium granulate and parts of the feeding lines not filled with liquid should be minimized. Therefore, the system pressure can be rapidly reduced to the ice operating pressure.

The sorption medium located within the sorption container adsorbs vapor from the icing container. The absorption causes the vapor to condensate to liquid within the sorption medium structure and to bind to the sorption medium granulate. As a result of the transformation from vapor to liquid, sorption heat is released which heats the sorption medium. The absorbability of the sorption medium rapidly decreases as its temperature increases. In order to maintain high absorbability of the sorption medium and high icing efficiency of the system over a long period of time, it is advantageous to reduce the temperature of the sorption medium Therefore, a cooling device is required to reduce the temperature of the sorption medium located in the sorption container. The cooling device may include heat exchangers for air or water cooling.

At room temperature the sorption medium has only a limited absorbability for water molecules. As the absorption capacity of the sorption medium decreases, the amount of ice produced diminishes. This reduction in output is noticeable at room temperature despite a working vacuum pump. In this case the sorption medium must be replaced with new sorption medium or the old sorption medium must be regenerated by a heating unit. Preferably, the sorption container is provided with a locking device through which the saturated sorption medium filler can be replaced with regenerated filler. A vacuum tight lid with a clamping ring is particularly advantageous for efficient and easy replacement of the sorption medium. To regenerate the sorption medium, it must be heated to temperatures between 150° C. and 300° C. depending on the type sorption medium and liquid used. As regeneration of the sorption medium occurs within the sorption container, the released liquid vapor must exit the sorption container and vent to the outside. Therefore, the condensation of the vapor to liquid within the ice maker is avoided.

In the case where the entire sorption medium filler is replaced, it is advantageous to pack the filler into a permeable housing and to exchange both the sorption medium and the housing. The housing must be shaped so that the vapor suctioned off by the vacuum pump from the icing container is always fed through the sorption medium and can never by-pass the sorption medium. In addition, care should be taken to avoid the presence of air pockets within the sorption medium filler because air pockets can prevent the vapor from properly contacting the sorption medium filler.

Zeolite has been successfully employed as a sorption medium. Zeolites are alumosilicates having a uniform crystal structure in which up to 36% by weight of water can be absorbed within its structure. Zeolites have a considerable ability to absorb vapor even at relatively high temperatures (above 100° C.). Therefore, zeolites are particularly well suited for use with the ice maker of the current invention. Specifically, zeolite type A, which contains sodium and magnesium and is stable even with frequent regeneration at temperatures of 250°-300° C., works well in the current invention.

To assure a uniform absorption within the sorption medium filler, sorption medium granulates should be used. Optimal results were observed with sorption medium granulate diameters of between 1-10 mm.

In the preferred embodiment, a ball stopcock shut off device is provided between the sorption container and the icing container. The shut off device closes the suction opening of the sorption container and does not allow vapor to leave the icing container and contact the sorption medium. In this manner the vacuum pump can preactivate the sorption container by reducing the pressure in the sorption container. After attaching the icing container and opening the shut off device, the required ice operating pressure in the system is obtained more rapidly. In addition, the instantaneous work which the vacuum pump must perform is lowered since the pump does not have to reduce the pressure of the entire system from atmospheric pressure, but instead reduces the system pressure from about 100 mbar depending on the volume of the icing container.

In the preferred embodiment, the ball stopcock shut off device is closed before venting the icing container. By venting the icing container through a venting device, the icing container can be easily removed from the flat sealing surface. Ideally, this venting device is located between the ball stopcock shut off device and the icing container so that when the icing container is changed, the pressure in the sorption container will not increase.

It is also desirable to couple the vacuum pump switch with the ball stopcock shut off device. If this is done, the vacuum pump will automatically operate when the shut off device is opened and it will automatically shut off then the shut off device is closed. As a result, the sorption container can remain under vacuum while the icing container and the suction opening are vented.

An ice maker not having a shut off device will allow the sorption container to become repressurized when the venting device is open. When attaching a new icing container, the vacuum pump must be separately started if it is not already operating. In order to circumvent a permanent operation of the pump, it is advantageous to provide an on/off switch which terminates pump operation when absolute pressure is below 6 mbar and which begins operation when the absolute pressure exceeds 6 mbar. The switch allows the pump to operate only when necessary and it prevents the continuous operation of the pump.

Mechanically actuated ball valves with nominal values above 20 mm have been shown to be effective for the ball stopcock shut off devices.

The ball valve may be coupled with a switch that turns the vacuum pump off when the ball valve is completely closed and turns the vacuum pump on when the ball valve is opened. Simultaneously, the venting device may be coupled with the actuation of the ball valve. Here, the venting device is opened when the ball valve is closed and closed when the same is opened.

Various structures may be inserted within the icing container, in particular on the bottom, which permit the frozen mass to be divided after removing the icing container from the flat sealing face. For example, "ice cubes" or similar structures may be made and can be later separated.

Although illustrative embodiments of the present invention have been described herein with reference to the accompanying drawings, it is to be understood that the invention is not limited to those precise embodiments and that various other changes and modifications may be effected therein by one skilled in the art without department from the scope or spirit of the invention.

I claim:

1. An ice maker comprising:
   an air tight sorption container enclosing sorption medium and having a suction opening,
   a vacuum pump coupled to the sorption container and communicating with the interior thereof to a permit decrease of the vapor pressure in the sorption container,
   an icing container separably coupled to the sorption container through the suction opening to provide a conduit for fluid flow between the icing container and the sorption container, and
   a baffle being in communication with fluid contained within the icing container so as to prevent a flow of liquid from the icing container to the sorption medium.

2. An ice maker as defined by claim 1 wherein the solid sorption medium is zeolite.

3. An ice maker as defined by claim 1 wherein a flat sealing surface is connected to the suction opening, the flat sealing surface providing a region allowing the icing container to be attached so that air cannot escape between the icing container and the flat sealing surface.

4. An ice maker as defined by claim 1 wherein a venting device is coupled to the suction opening, the venting device providing a means through which the icing container can be vented to remove the icing container from a flat sealing surface.

5. An ice maker as defined by claim 4 wherein a shut off device is provided between the airtight sorption container and the venting device, the shut off device preventing air flow from the icing container to the sorption container.

6. An ice maker as defined by claim 1 wherein the icing container is a drinking glass.

7. An ice maker as defined by claim 1 wherein the sorption container is provided with a cooling device through which the sorption medium can be cooled.

8. An ice maker as defined by claim 1 wherein the sorption container contains a heating device through which the sorption medium is regenerated by heating the sorption medium.

9. An ice maker as defined by claim 1 wherein a vacuum tight cover is disposed within the sorption container, the vacuum tight cover bracing the sorption container so that an air tight seal is formed.

10. An ice maker as defined by claim 1 wherein a switching means is provided which automatically turns the vacuum pump off for an interruption in vacuum pump operation.

11. An ice maker as defined by claim 1 wherein the air tight sorption container is configured such that the vapor suctioned off by the vacuum pump for the icing container passes the sorption medium.

12. An ice maker as defined by claim 1 wherein a feeding line extends from a supply container to the icing container, the feeding line supplying the icing device with aqueous liquid to be solidified.

13. An ice maker as defined by claim 12 wherein the baffle is mounted on the feeding line within the icing container, the baffle being oriented below the suction opening.

14. An ice maker comprising:
   an air tight sorption container enclosing sorption medium and having a suction opening,
   a vacuum pump coupled to the sorption container and communicating with the interior thereof to permit decrease of the vapor pressure in the sorption container,
   an icing container separably coupled to the sorption container through the suction opening, to provide a conduit for fluid flow between the icing container and the sorption container,
   a feeding line extending from a supply container to the icing container, the feeding line supplying the icing container with aqueous liquid to be solidified, and
   a baffle disposed in communication with fluid contained within the icing container so as to define means to prevent a flow of liquid from the icing container to the sorption medium.

15. An ice maker comprising:
   an air tight sorption container enclosing sorption medium and having a suction opening,
   a vacuum pump coupled to the sorption container and communicating with the interior thereof to permit a decrease of vapor pressure in the sorption container,
   an icing container separably coupled to the sorption container through the suction opening to provide a conduit for fluid flow between the icing container and the sorption container,
   a flat sealing surface connected to the suction opening, the flat sealing surface providing a region allowing the icing container to be attached so that no air can enter the inside of the icing container, a venting device coupled to the suction opening, the venting device providing a means through which the icing container can be vented to remove the icing container from the flat sealing surface, and a baffle disposed in communication with fluid contained within the icing container so as to define means to prevent a flow of liquid from the icing container to the sorption medium, wherein the sorption medium is zeolite.

* * * * *

UNITED STATES PATENT AND TRADEMARK OFFICE
CERTIFICATE OF CORRECTION

PATENT NO. : 5,207,073
DATED : May 4, 1993
INVENTOR(S) : Maier-Laxhuber et al.

It is certified that error appears in the above-identified patent and that said Letters Patent is hereby corrected as shown below:

Column 2, Line 31, change "cover is", to --cover 8 is--.

Column 5, Line 59, change "sorption medium Therefore", to --sorption medium. Therefore--.

Column 7, Line 48, change "to a permit", to --to permit--.

Signed and Sealed this

Twenty-second Day of February, 1994

Attest:

BRUCE LEHMAN

Attesting Officer     Commissioner of Patents and Trademarks